June 25, 1963    J. H. HELLER    3,095,359
HIGH-FREQUENCY TREATMENT OF MATTER
Filed Nov. 16, 1959    2 Sheets-Sheet 1

INVENTOR
JOHN H. HELLER
BY Pennie, Edmonds,
Morton, Barrows & Taylor
ATTORNEYS

June 25, 1963   J. H. HELLER   3,095,359
HIGH-FREQUENCY TREATMENT OF MATTER
Filed Nov. 16, 1959   2 Sheets-Sheet 2

JOHN H. HELLER

United States Patent Office 3,095,359
Patented June 25, 1963

3,095,359
HIGH-FREQUENCY TREATMENT OF MATTER
John H. Heller, Wilton, Conn., assignor to New England Institute for Medical Research, Ridgefield, Conn., a corporation of Connecticut
Filed Nov. 16, 1959, Ser. No. 853,188
4 Claims. (Cl. 195—78)

This invention relates to the treatment of particles of living matter in a high frequency field, and has for its object the provision of an improved process, and the products resulting therefrom. The process comprises subjecting the matter in a suitable carrier or supporting medium to a pulsed electric field at a carefully controlled voltage and frequency resulting in a selective and controllable change in the particles of matter, and the production of new materials and organisms.

This invention is concerned with the treatment of various living organisms, such as cells, spores, bacteria, plants, insects and animals, to effect various changes in the organisms resulting in new materials or products. The process can produce a mutagenic change in cells or in bacteria to produce new strains of cells, bacteria, plants, insects or animals, resulting in new species of such organisms. The process may be operated at such a controlled voltage and frequency as to inactivate or kill various species of bacteria in a heterogeneous mass of bacteria to isolate a desired species for culture or changed characteristics.

The invention is based to some extent on the discovery that the effect desired on the organism is both frequency and voltage dependent in a pulsed electric field. This means that there is a voltage threshold at which things happen, and the increment of voltage over the threshold gives an additional degree of change. The types of changes are determined by frequency. It has been determined that one can replicate the mutagenic effects of ionizing radiation and mitotic poisons and derive new mutations not heretofore seen. The mutagenic substances produced include bacteria, spores, plants, insects, and animals. For instance, at about 30 megacycles, one can produce in neoplastic mammalian cells a degree of chromosomal aberration of such a magnitude that the cells could not divide further. They merely became old and died.

At other frequencies there can be obtained a whole spectrum of other chromosomal aberrations. However, in the exposure of the sperm or ova of mature animals in vivo, at about 25 megacycles one can produce eight times as many females as males. At 30 megacycles, there is no change in the exposed generation, but in the second generation there is a predominance of males over females by two to one. At 28 megacycles, two dominant characteristics in the eye, when mated, produced a recessive which most unusual.

Gladiolus seeds exposed at 3 and 27 megacycles sprouted earlier and grew more rapidly than the controls, and there is a definite difference between those which were exposed at the higher frequency versus the low frequency. Interesting and significant changes were made in histine-deficient bacteria after exposure. At 31 megacycles they were mutated back to non-histidine-deficient organisms. At 18 megacycles a strain of lactose fermentors was turned into a strain of non-lactose fermentors which bred true. Many generations later the non-lactose-fermentors were exposed at 22 megacycles and their ability to ferment lactose returned and they also bred true. The process can be controlled to separate two different Penicillium spores which are apparently identical except that one is a mutant and produces a different type of penicillin (*Penicillium chrysogenum*). For example, the spores produce different orientation at 11 megacycles. At 22 megacycles there was a different voltage threshold at which alignment occurred, being 800 volts in one case and only 500 volts in the latter. Another Penicillium which occasionally and erratically produced a penicillinase-resistant Penicillium was found at 5 megacycles to show homogeneity, but at 14 megacycles about one percent of the cells oriented at 90° demonstrating that they were mutants. It was these mutants which appeared to produce the penicillinase-resistant Penicillium.

The invention provides a process for subjecting a living organism to an electromagnetic field (an E field) at a frequency of from 1 to 250 mc., at a voltage of from 0 to 100 kv., with pulse width from 1 $\mu$sec. to 10 milliseconds, and pulsed at from 30 to 10K pulses per second, in which the pulsations are controlled to protect the organism and the frequency and voltage are selected to effect the desired change. The invention provides the products which result from the process.

The process of the invention may be carried out by supporting the organism in a medium such as water, in an electric field through which no current passes, produced between two electrodes which are separated from the organism undergoing treatment by an interposed dielectric barrier. The objective of the invention is to impose upon the organism an E field at a selected frequency and voltage which is pulsed to minimize adverse thermal effects.

One feature of the process of the invention is the dependency of the particular organism on frequency and voltage. It appears that each organism is responsive to a critical frequency and voltage, and that these electrical values can be found by examining the specimen under high magnification (when this is necessary) while tuning to the desired frequency and voltage. In other words, the specimen being treated becomes a part of a tuned circuit, having in the larger operations, the effect of a condenser in an oscillating field.

The invention provides a combination and arrangement of apparatus which is particularly advantageous in carrying out a process of the invention. The apparatus preferably comprises at least one pair of electrodes spaced a suitable distance apart and connected to a pulsed high frequency electric source which produces an E field between and around the electrodes, and container means for the specimen to be treated which is physically separated from the electrodes by a dielectric member such as a barrier of glass. The process can be carried out by using one electrode but not as effectively as with two electrodes.

These and other novel features of the invention will be better understood after considering the following discussion taken in conjunction with the accompanying drawings in which.

Figure 4:
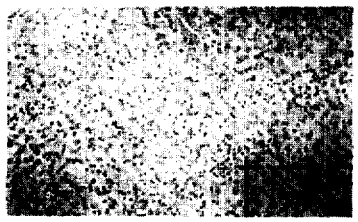
FIG. 4 is a photograph of polystyrene particles in random arrangement under a magnification of 650×.
Figure 5:
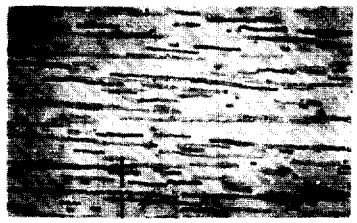
FIG. 5 is a photograph of the particles of polystyrene of FIG. 4 when under the pulsed high-frequency field.
Figure 10:
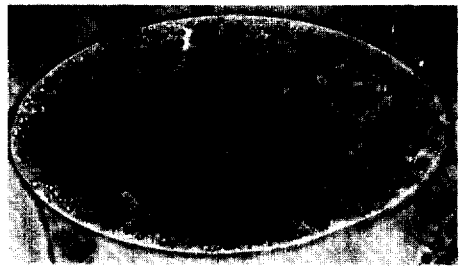
Figure 11:
Figure 12:
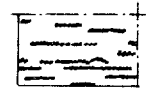

FIG. 10 is a photograph of an amoeba when under a high-frequency field at a magnification of 150×, and FIGS. 11 and 12 are instrument drawings of areas 11—11 and 12—12 of FIGS. 4 and 5 respectively.

Figure 1:
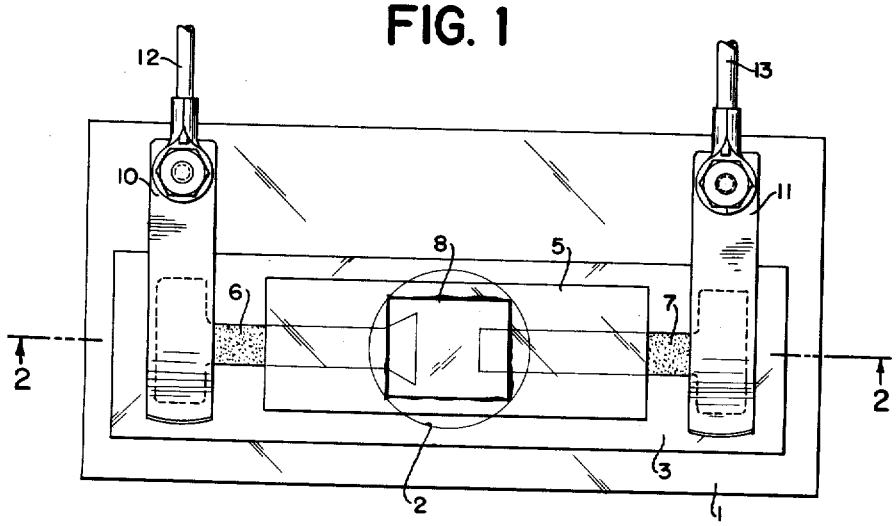
FIG. 1 is a side elevation of one embodiment of apparatus for carrying out the process of the invention.
Figure 2:
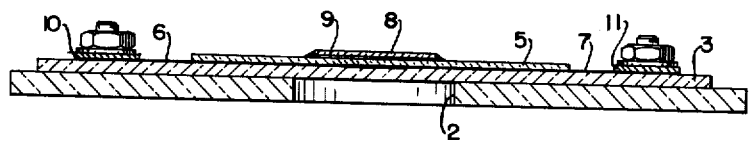
FIG. 2 is a sectional view at 2—2 of FIG. 1.

The apparatus illustrated in FIGS. 1 and 2 comprises a base 1 which may be of glass or non-conducting plastic having a hole 2 in the center to facilitate microscopic examination, and a glass support 3. This apparatus mounted over the support 3 comprises a cell or vessel 4 formed of a glass plate or slide 5 which is mounted over the electrodes 6 and 7. The electrodes may conveniently be formed by painting silver on the plate 3. The cell cavity 8 (in this case a very thin space for specimens to be subjected to microscopic studies) is between the slide 5 and the glass cover slip 9 which is cemented over the slide 5 in the usual way as with wax to enable one to examine the organism, for example, bacteria in a water medium in the cavity 8. The electrodes 6 and 7 are connected by the leads 10 and 11 to the wires 12 and 13 which are connected to a source of high-frequency voltage (not shown) which can create a pulsed, variable voltage and high-frequency E field between the electrodes which passes through the cavity 8.

The apparatus of FIGS. 1 and 2 is primarily useful for operations carried out in the laboratory. However, this apparatus may be used to form small sample products for culture in the production of larger quantities of the same product.

Figure 3:
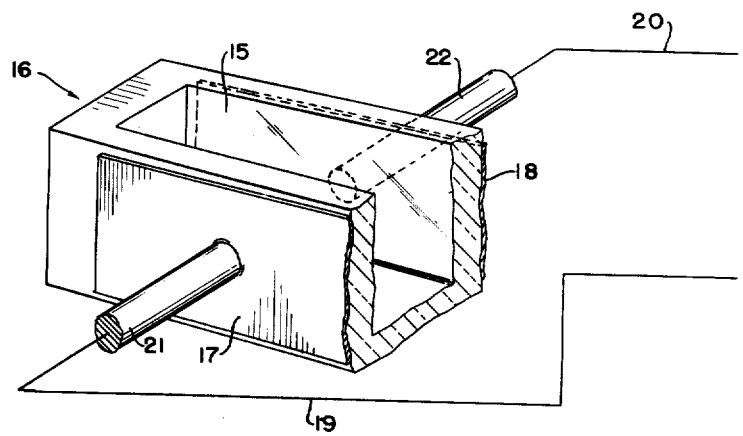
FIG. 3 is a perspective of another arrangement of apparatus for carrying out the process of the invention.

FIG. 3 illustrates another embodiment of apparatus for carrying out the process of the invention which is suitable for the treatment of relatively large quantities of material, comprising a reaction chamber 15 formed within a rectangular vessel 16 which is preferably formed of glass or other high dielectric material to minimize the passage of current through the chamber. The electrodes 17 and 18 are flat metal plates mounted on the outside of the vessel 16 and out of direct contact with the material in the chamber 15 where the material is being treated. The electrodes are connected to the electrical cables 19 and 20 which are preferably connected to metal bars 21 and 22 respectively in welded connection to the electrodes. The cables 19 and 20 are connected to an electrical apparatus (not shown) which can impose between the electrodes an E field at a voltage varying from 0 to 5000, at a frequency varying from 1 to 250 mc. with 1 μsec. to 10 millisec. pulses, and pulsed at from 30 to 10K pulses per second. The apparatus of FIGS. 1 and 2 is connected to electrical apparatus capable of producing a similar E field.

The following example is illustrative of a process carried out in accordance with the invention. In this example an apparatus similar to that illustrated in FIGS. 1 and 2 was used.

A mixture of the three organisms Colpidium, Rhabdomonas incurva, and Astasia klebsi in a water medium in the space 8 between the side 5 and the cover slip 9, with the electrodes three mm. apart, was treated under various E field values. At eight megacycles and a peak-to-peak voltage of 420, pulsed at 15 μsec., 1000 p.p.s., all the organisms traveled east to west. At 13.4 megacycles, and a peak-to-peak voltage of 1820, pulsed at 15μsec., 1000 p.p.s., the Rhabdomonas went east to west, Astasia went from north to south, while Colpidium was random. At 27 megacycles and a peak-to-peak voltage of 924 and pulsed at 15 μsec., 1000 p.p.s., all organisms traveled from north to south. These tests showed clearly that the results were achieved because of the frequency and voltage dependency of the particular organisms.

Rats having tumors (Walker carcinoma) were treated according to the invention by placing the tumors between two electrodes, each about two centimeters square. These tumors were treated at thirty megacycles and two thousand volts, with ten microsecond pulses, and a repetition rate of five hundred pulses per minute for ten minutes once a day. Tumor regression appeared complete at the end of eight days. At three megacycles with everything else constant there was no change in the tumors.

The specimens treated and photographed that are reproduced in FIGS. 4 to 10 were made in the apparatus shown in FIGS. 1 and 2. FIG. 4 shows an aqueous dispersion of particles of polystyrene at 1.171 micra. The particles were not under an E field and were in random dispersion. The same dispersion of FIG. 4 was subjected to an E field at a voltage of 8000, a frequency of 17 mc., and pulsed at 50 μsec., 1000 p.p.s. The particles assumed the aligned order of FIG. 5 and resumed the random arrangement when the field was stopped.

Figure 6:
FIG. 6 is a photograph of starch particles in random arrangement under a magnification of 250×.
Figure 7:
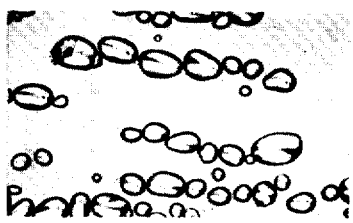
FIG. 7 is a photograph of the starch particles of FIG. 6 when under the pulsed high-frequency field at a magnification of 250×.

FIG. 6 shows an aqueous dispersion of starch particles in random arrangement photographed in polarized light at a magnification of 250×. When the starch particles of FIG. 6 were subjected to an E field at a voltage of 600 v., at a frequency of 5 mc. and pulsed at 20 μsec., 1000 p.p.s., the particles not only became oriented but also became aligned in chains as shown in FIG. 7. On interruption of the field the starch particles remained aligned as they are too big to be dispersed by Brownian motions, and they do not have electric surface charges of a magnitude large enough to cause adequate repulsion.

Figure 8:
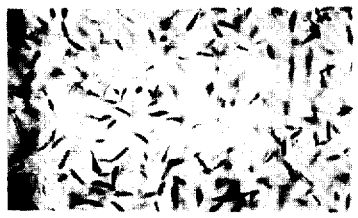
FIG. 8 is a photograph of euglena in random arrangement under a magnification of 150×.
Figure 9:
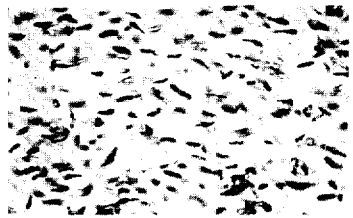
FIG. 9 is a photograph of the euglena of FIG. 8 when under a pulsed high-frequency field at a magnification of 150×.

FIG. 8 shows the species of *Euglena gracilis* in random arrangement when not under an E field and under a magnification of 150×. These protozoa normally swim about in the aqueous media in non-directional meandering. FIG. 9 shows the same *Euglena gracilis* when under an E field at a voltage of 400, a frequency of 6 mc. and a circuit pulsed at 15 μsec., 500 p.p.s. The protozoa assumed the alignment shown and all traveled from right to left or east to west.

FIG. 10 is the photograph of an amoeba under a magnification of 150× in an E field at a voltage of 1000, at a frequency of 9.4 mc. and pulsed at 22 μsec., 500 p.p.s. One of the amazing effects of the critical E field is the changes that it can produce within a cell or a simple organism. As shown in FIG. 10 the intracellular inclusions have their longitudinal axes aligned in the direction right to left. Normally inclusions are in random arrangement. It appears that the internal changes which take place in the cells is one of the factors causing mutagenic changes in cells which can result in new species of living organisms.

I claim:

1. The process which comprises subjecting a living organism to a pulsed high-frequency electromagnetic E field at a frequency of from 1 to 250 mc., at a voltage of from 0 to 100 kv., with pulse width of from 1 μsecond to 10 milliseconds, and pulsed at from 30 to 10K pulses per second, said organism being in a carrier medium having extremely high dielectric properties through which substantially no current flows to minimize the passage of current through the organism.

2. The process of treating a living organism to effect changes therein which comprises subjecting the organism to a pulsed E field at a frequency of from 1 to 250 mc., at a voltage of from 0 to 100 kv., with pulse width of from 1 μsecond to 10 milliseconds, and pulsed at from 30 to 10k pulses per second, said E field being controlled by adjusting the frequency and voltage by tuning with the organism acting as a part of the circuit.

3. The product resulting from carrying out the process of claim 2.

4. The process of treating a heterogeneous mass of living cells to separate one species from the others which comprises subjecting the organisms to a pulsed E field at a frequency of from 1 to 250 mc., at a voltage of from 0 to 100 kv., with pulse width of from 1 μsecond to 10 milliseconds, and pulsed at from 30 to 10K pulses per second, to cause one species of cells to travel in a direction away from the other species of cells, said particular frequency and voltage being selected by tuning the circuit with the mass of cells acting as a part of the circuit.

References Cited in the file of this patent

UNITED STATES PATENTS

| | | |
|---|---|---|
| 2,089,966 | Kassner | Aug. 17, 1937 |
| 2,553,944 | Schlesman | May 22, 1951 |
| 2,955,076 | Gossling | Oct. 4, 1960 |

OTHER REFERENCES

"Effect of High-Frequency Fields on Microorganisms," by Fleming, Elec. Eng., January 1944, pp. 18–21.